United States Patent [19]

Shoenfeld

[11] Patent Number: 4,996,786

[45] Date of Patent: Mar. 5, 1991

[54] X-RAY VIEWER WITH AUTOMATIC COMPENSATION FOR CHANGES IN LIGHT INTENSITY

[76] Inventor: Harold Shoenfeld, 12400 Quercus La., West Palm Beach, Fla. 33414

[21] Appl. No.: 931,707

[22] Filed: Nov. 17, 1986

[51] Int. Cl.$^5$ .............................................. G02B 27/02
[52] U.S. Cl. .................................... 40/361; 315/151; 315/158
[58] Field of Search ................ 40/361, 362, 366, 367; 315/156, 158, 151, 158, 307, 217, 216, 215; 250/205, 206, 239

[56] References Cited

U.S. PATENT DOCUMENTS

| | | | |
|---|---|---|---|
| 3,492,486 | 1/1970 | Bischoff et al. | 40/361 |
| 4,097,732 | 6/1978 | Krause et al. | 250/205 |
| 4,101,808 | 7/1978 | Flint | 250/205 |
| 4,118,654 | 10/1978 | Ohta et al. | 40/361 |
| 4,335,421 | 6/1982 | Modia et al. | 40/367 |
| 4,467,246 | 8/1984 | Tanaka et al. | 315/158 |

OTHER PUBLICATIONS

D. A. Schoonover et al., "Lamp Intensity Control", IBM Technical Disclosure Bulletin, vol. 8, #8, Jan. 1966, pp. 1087-1088.
General Electric Brochure 5536 (1983).

Primary Examiner—Kenneth J. Dorner
Assistant Examiner—J. Hakomaki

[57] ABSTRACT

A fluorescent X-ray viewer includes a photosensor within the housing proximate to the fluorescent lamps for detecting the intensity of the light prior to transmission through the X-rays or other transparencies to be viewed. A dimming circuit is used to adjust the intensity of the fluorescent lamps to less than the nominal value, and feedback through the photosensor is used to maintain the light intensity output at a substantially uniform level to compensate for line and load variations and aging and changes of the efficiency of the fluorescent lamps. The X-ray viewer is provided with an LED warning indicator which is energized when the lamps have deteriorated to an extent which requires replacement.

19 Claims, 5 Drawing Sheets

X-RAY VIEWER WITH AUTOMATIC COMPENSATION FOR CHANGES IN LIGHT INTENSITY

BACKGROUND OF THE INVENTION

1. Field of the Invention

The invention generally relates to X-ray film viewers, and more specifically to such a device with automatic light intensity compensation for changes in load and line voltage and aging of the source of illumination.

2. Description of the Prior Art

In many applications, transparencies or negatives are not used to print positive pictures, but are viewed directly by transmission of light through them. One very common such application is the viewing of X-rays by doctors and other medical personnel. Industrial X-ray pictures are also viewed in this manner to examine mechanical parts and the like and illuminated viewing boxes are used in photography to examine negatives for selection for printing of pictures.

Typically, X-rays and other transparencies are viewed by placing same against a light transmissive screen, such as a light diffusion plate, which forms one wall of a film viewer which houses a source of illumination such as incandescent, halogen, or fluorescent light sources. A detailed observation of the X-rays is facilitated by transmission through the film of adequate intensity light. However, the brightness of the light source cannot be excessive since that would make extended examinations of the films difficult and the viewer would be exposed to substantial levels of light intensity when the film is removed. The viewing of a large number of such negatives in succession would require that the viewer's eyes continuously adjust between very high intensity light levels and significantly lower light intensity levels, and this could make the viewing uncomfortable and tedious.

U.S. Pat. No. 4,118,654, issued on Oct. 3, 1978 to Ohta et al. discloses an automatic light intensity control for an X-ray film viewer. Ohta et al. teach the use of a photo-detector mounted externally of the film viewer so that it receives the same light that passes through the X-ray film which is viewed by the observer. The photo-detector is intended to only detect the intensity of light which penetrates through the film. While Ohta et al. intend to shield the photosensor from ambient light and only respond to light which passes through the film, it is possible that ambient light will modify the results since the photo-detector is mounted outside of the X-ray film viewer.

Ohta et al. also teach the use of a control knob for manually setting the intensity level of the light. Therefore, the user can presumably adjust the light intensity output level at or near the maximum or nominal light level intensity, or at a level substantially below the nominal value. Although Ohta et al. describe a circuit for automatically controlling the light source to maintain a constant level of intensity, it is improbable that the circuit can fully compensate for line and load variations and aging of the sources of light under all circumstances, particularly when the user has already manually adjusted the units for maximum light intensity. Ohta et al. are primarily concerned with maintaining a constant light level at the output of the X-ray film, irrespective of the transmissivity of such film. The patent is not directed to the solution of the problem of maintaining the output of the source of illumination at a substantially constant level prior to passage through the X-ray film as a result of line and load variations and aging of the light source.

Another X-ray viewer provides two levels of illumination. The first level provides a lower standard intensity of illumination and is intended for preliminary viewing and general use. A second high brightness level of illumination is provided which is approximately 50% higher than the first level, and is intended for viewing of darker films or those that are less light transmissive. However, the device does not appear to provide automatic light intensity compensation, but only provides one of two selected levels of such light intensity.

SUMMARY OF THE INVENTION

It is one of object of the present invention to provide an X-ray viewer with automatic compensation for changes in light intensity which does not have the problems and disadvantages inherent in the prior art or known X-ray viewers.

It is another object of the present invention to provide an X-ray viewer of the type under discussion which is simple in construction and economical to manufacture.

It is yet another object of the present invention to provide an X-ray viewer of the type above suggested which monitors the light output at the light source prior to transmission through the X-ray or other transparency to be viewed, and which automatically compensates for changes in light intensity output for line and load variations and aging of the light source.

It is a further object of the present invention to provide an X-ray viewer of the type described in the last object, wherein the sources of light are fluorescent bulbs or lamps.

It is still a further object of the present invention to provide an X-ray viewer with a pre-setting control which can be set to a preselected or preset level of light intensity which cannot be easily modified or changed by the user.

It is yet a further object of the present invention to provide an X-ray viewer of the type under discussion which includes a warning signal to alert the user when the light source has attained a condition when it must be replaced since it can no longer be automatically adjusted to maintain a desired predetermined level of light intensity.

In order to achieve the above objects, as well as others which will become apparent hereafter, an X-ray viewer in accordance with the present invention comprises a housing and at least one fluorescent lamp within said housing. A light transmissive screen forms a wall of said housing for passage of light from said at least one fluorescent lamp to allow viewing of an X-ray or other transparency placed outside said housing adjacent to said screen. Photo-detector means is arranged within said housing proximate to said at least one fluorescent lamp for detecting the intensity of the light emitted by said at least one fluorescent lamp prior to transmission through said screen. Electrical circuit control means is provided for dimming said at least one fluorescent lamp to a desired predetermined level below the nominal light intensity level and automatically adjusting the light intensity to maintain a substantially uniform light intensity output from said at least one fluorescent lamp corresponding to said desired predetermined light intensity level, thereby compensating for factors influencing the light intensity output of said at least one fluorescent lamp, including line and load variations and aging of said at least one fluorescent lamp.

Advantageously, said electrical circuit control means includes pre-setting means for pre-setting the dimming level of said at least one fluorescent lamp to said desired predetermined level, and said pre-setting means is arranged so as to be generally inaccessible from the outside of said housing. In this manner, initial adjustments can be made by the manufacturer and not modified by the user.

According to a further feature of the present invention, warning means are provided for providing a signal when said electrical circuit control means is no longer capable of adjusting said at least one fluorescent lamp to provide said desired predetermined level of light intensity. In accordance with the presently preferred embodiment, such warning means include an LED for providing a visible flag when the intensity of the fluorescent lamp can no longer be adjusted or increased.

BRIEF DESCRIPTION OF THE DRAWINGS

The foregoing and other features of the present invention will be more readily apparent from the following detailed description and drawings of an illustrative embodiment of the invention in which.

DESCRIPTION OF THE PREFERRED EMBODIMENT

Figure 1:
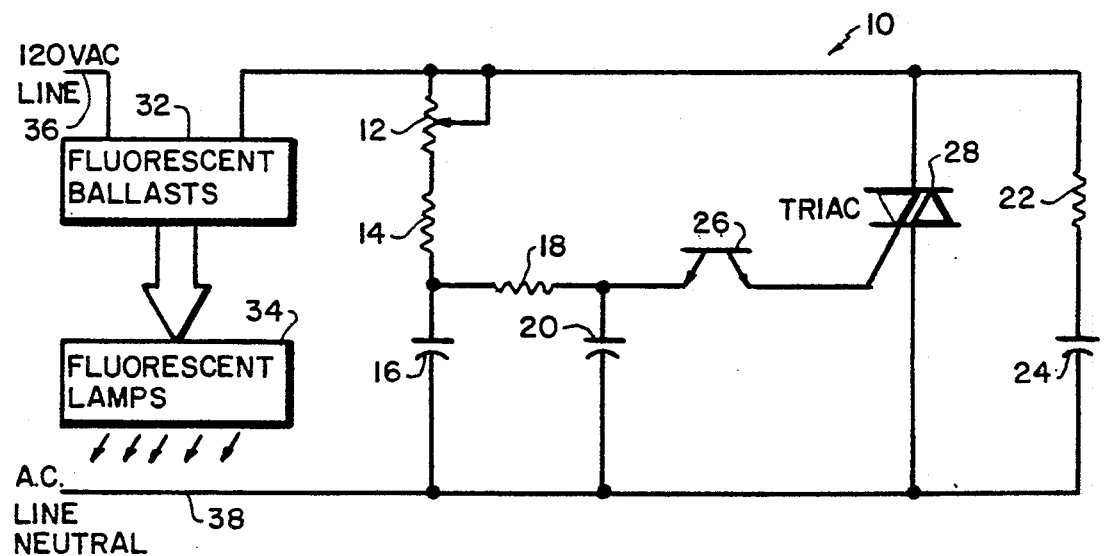
FIG. 1 is a schematic diagram illustrating a typical conventional o prior art dimmer.

Referring now specifically to the FIGS., in which identical or similar parts are designated by the same reference numerals throughout, and first referring to FIG. 1, there is illustated a typical conventional or prior art dimmer generally designated by the reference numeral 10.

This disclosure describes a technique for dimming and regulating the intensity of fluorescent light and its application in X-ray film (radiograph) illumination and reading. Many radiologists prefer to view or to "read" X-ray films at various light intensities to better suit the range of film densities encountered to visual sensitivities and individual preferences. The vast majority of film reading is performed with fluorescent lighting. For several technical reasons, fluorescent lighting does not lend itself as readily to dimming as does incandescent lighting. A dimmer circuit such as that shown in FIG. 1 can be used to alter or modify the light level intensity output from fluorescent lamps.

In FIG. 1, the dimmer 10 utilizes an RC (resistance-capacitance) network consisting of adjustable resistor 12, resistor 14, capacitor 16, resistor 18, capacitor 20, resistor 22 and capacitor 24. A diac 26 is shown connected to a triac 28 to achieve phase control of the current flowing through fluorescent lamp ballasts 32. The resistor 12 provides a limited range of adjustment of light intensity. The ballasts 32 are connected and supply the fluorescent lamps 34. The dimmer is connected across AC power lines 36, 38. The circuit 10 characteristically provides no line or load regulation and consequently the brightness of the fluorescent lamps 38 will vary directly with changes in line voltage, and will not compensate for normal reduction in light intensity caused by aging or other losses in lamp efficiency.

Figure 2:
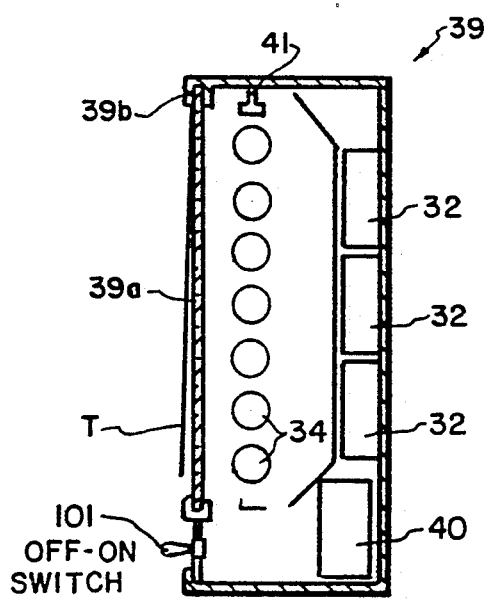
FIG. 2 is a cross-sectional view of a typical X-ray viewer, showing the fluorescent lamps and one internal arrangement of the photosensor for monitoring or detecting the intensity of the light emitted by the fluorescent lamps.

Referring to FIG. 2, an X-ray viewer is shown in cross-section and generally designated by the reference numeral 39. The specific shape or configuration of the viewer housing is not critical. The viewer 39 is shown to have a light transmissive glass screen or panel 39a through which internally generated light from the fluorescent bulbs 34 pass and continue through an X-ray film or other transparency T which may be held in the position shown by clip 39b or other conventional devices.

The viewer 39 includes electrical circuit control means, generally designated by the box 40, which will be more fully described in connection with FIG. 3. Also illustrated is one possible position for a photosensor or photodetector 41 inside the viewer 39 and proximate to at least one of the fluorescent lamps 34 for monitoring the output light intensity thereof.

Figure 3:
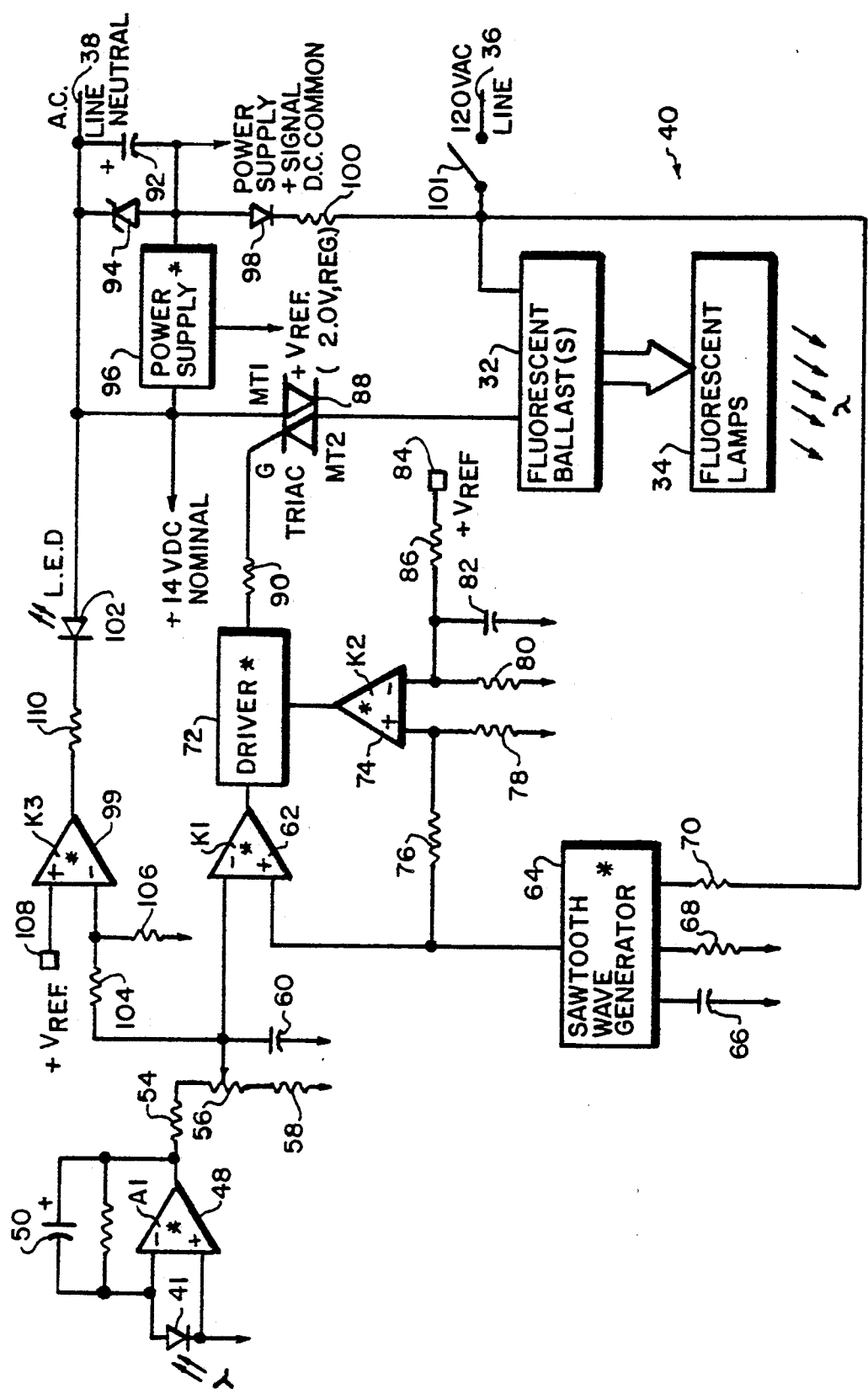
FIG. 3 is an electrical circuit schematic showing a regulating dimmer in accordance with the present invention used in conjunction with the X-ray viewer shown in FIG. 2.

Referring to FIG. 3, there is illustrated the electrical schematic in accordance with the presently preferred embodiment for the regulating dimmer. The control circuit 40 includes, as above noted, a photodetector 41 which may be a silicon cell and is arranged within the housing of the viewer 39 for monitoring and detecting the output light intensity of the fluorescent lamps 34. The photocell 41 is connected across the differential inputs of amplifier 48, with capacitor 50 and resistor 52 being connected between the negative differential input and the output of the amplifier. The output of the amplifier 48 is connected to common potential through resistors 54, 56 and 58, resistor 56 being an adjustable potentiometer.

The sliding contact of the potentiometer 56 is connected to the negative differential input of a comparator 62, with the positive differential input of the comparator being connected to the output of a sawtooth wave generator 64. The sawtooth generator 64 is provided with timing elements including capacitor 66 and resistor 68. A further resistor 70 connects the sawtooth wave generator to the AC power line.

The output of the comparator 62 is connected to a driver 72, another input of which is connected to the output of comparator 74. A resistor 76 is connected between the positive differential inputs of the comparators 62 and 64. The positive differential input of the comparator 74 is also connected to the common D.C. potential through resistor 78. A resistor 80 and, capacitor 82, forming a low frequency filtering circuit, are connected to the negative differential input of the comparator 74 and and connected to a source 84 of reference potential through resistor 86.

A triac 88, connected between one of the A.C. power lines 38 and the fluorescent ballasts 32, has its gate connected to the triac driver 72 through resistor 90.

The A.C. power line 38 is filtered to the common potential by means of capacitor 92, a Zener diode 94 being connected across the capacitor 92 to produce the desired levels of D.C. voltage at the output of the power supply 96. The power supply 96, in the circuit being described, generates +14 volts of D.C. which is a nominal voltage for operating the various electrical components such as amplifiers, comparators, etc., and a reference voltage of +2 volts. The reference voltage is used at the terminal 84 as well as at the positive differential input of the comparator 99, to be more fully described below.

A series connected diode 98 and resistor 100 connect the A.C. power line 86 to the power supply 96 as shown.

A switch 101 is advantageously provided which can turn the dimmer on and off by applying or removing AC power, although any other switch or control may be used for this purpose.

All of the items which have been marked with an asterisk in FIG. 3 are available on an integrated circuit which has been used to construct the circuit shown. The integrated circuit which has been used for this purpose is the Siemens' device TLE 3101 described in the *Siemens Consumer IC Data Book*—1985, pages 735-745. The Siemens' TLE 3101 is a phase control IC with independent on-chip op amp 48 and comparator 99. However, any other integrated circuit or discrete components may be used, and the Siemen device is mentioned only by way of example since it has been satisfactorily functioned in the circuit shown.

The dimmer shown in FIG. 3 accomplishes phase control of the fluorescent lamp ballasts 32 and its resultant light dimming by using the line synchronized sawtooth wave generator 64 and comparator 62 in conjunction with the light or photosensor 41 and the resultant feedback loop of which these elements form a part. The silicon photocell 41 samples an averaged level of fluorescent light and produces a current which is proportional to the intensity of the incident light λ. The current is converted to an analog voltage by amplifier 48, and filtered to remove the A.C. fluctuations associated with fluorescent light sources. The smoothed D.C. voltages apply to one input of the comparator 62 while the sawtooth wave generator 64 output is applied to the other input. The output of the comparator 62 is applied to triac driver circuitry 72 triggers the triac 88 into latched conduction once each half period of the A.C. line of frequency.

A sample of the dimmed light from the fluorescent lamps 34 is coupled to the silicon photocell 41 completing the feedback loop. Thus, for variations in fluorescent light intensity caused by changes in line voltage or by aging characteristics of the fluorescent lamp 34, a correction signal is automatically produced and applied to the control circuitry causing the level of fluorescent light to remain relatively constant.

The adjustable potentiometer 56 comprises a pre-setting adjustable element used to preset the dimming level of the fluorescent lamps 34 to a desired predetermined level. The potentiometer 56, however, is advantageously made inaccessible or inconvenient to be reached by the user. Preferably, the potentiometer 56 is preset at the factory to provide the desired predetermined level of light intensity. The specific level of light intensity which is preselected is not critical for purposes of the present invention. However, the initial setting of the potentiometer 56 should be such that the fluorescent lamps 34 operate at a level below their nominal light intensity values so that the control circuit 40 can boost the light intensity levels over time to compensate for losses associated with such fluorescent lamps, including line and voltage variations, aging, losses of efficiency, etc. The circuit 40, therefore, initially dims or reduces the potentially available output from the fluorescent lamps so that such lamps can be increasingly energized or otherwise appropriately adjusted to maintain a substantially constant level of light intensity output.

In accordance with another feature of the present invention, there is advantageously provided a warning mechanism for providing a signal when the electrical circuit 40 is no longer capable of adjusting the fluorescent lamps 34 to provide the desired predetermined level of light intensity. In FIG. 3, such warning element is an LED 102 for providing a visible flag to the user when the circuit is no longer capable of making the necessary adjustments for further fluctuations in the external conditions or the deteriorating conditions of the fluorescent lamps 34. To accomplish this, the negative potential input of the comparator 99 is connected to the sliding output of the potentiometer 56 by means of a voltage divider including resistors 104 and 106. The positive potential input of the comparator 99 is connected to a source of positive reference potential which, as suggested above, can be the reference potential output of the power supply 96. The output of the comparator 99 is connected to the LED 102 by means of a resistor 110. In the specific embodiment illustrated and described, the comparator 99 is used to signal when conditions are such that the loop is no longer able to compensate adequately for low line voltage excursions (typically below 110 volts), or for lamps which through aging and use have lost efficiency and should be replaced. The light emitting diode 102 is driven directly by the comparator circuitry and provides a clear visual indication of such conditions. It is pointed out, however, that other warning devices or elements may be used in place of or in addition to an LED visible indicator. Audible sound emitters and other warning elements are well known to those skilled in the art and can be used individually or in any combination.

Figure 4:
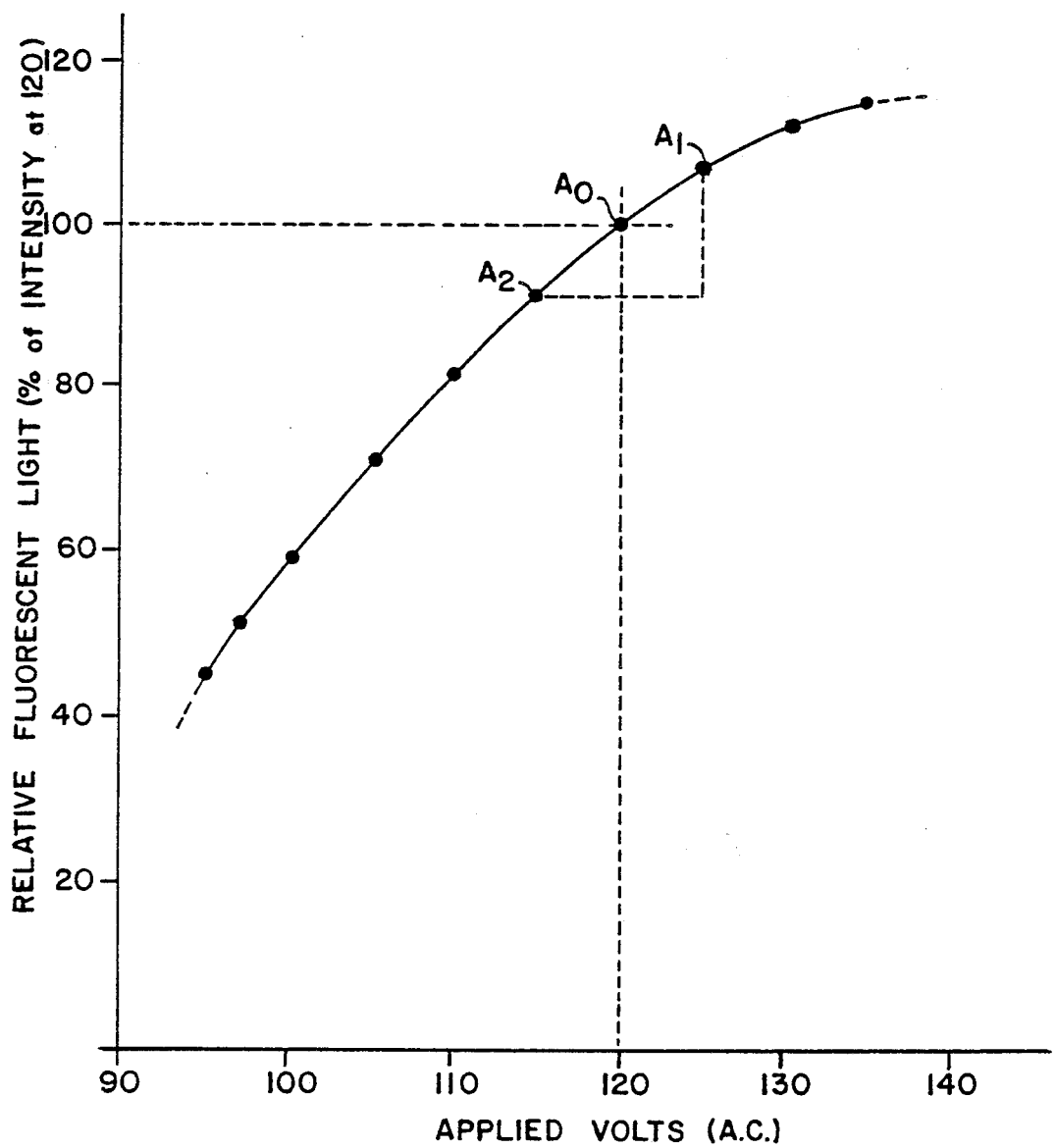
FIG. 4 is a plot or chart quantitatively indicating the typical functional relationship of fluorescent light intensity to its AC supply voltage.

To illustrate the benefits of the disclosed apparatus and method of fluorescent dimming, reference will be made to FIGS. 4, 5 and 6. FIG. 4 indicates quantitatively the typical functional relationship of the fluorescent light intensity to its A.C. supply voltage. Considering 120 volts A.C. to be nominal line voltage, the slope of the response curve of FIG. 3 reflects an average of 1.55% change in brilliance per volt change of applied voltage. This slope increases at lower line voltages and illumination levels. FIG. 4 illustrates the slope to be measured at $A_o$, at the nominal or applied voltage of 120 volts, the average slope being measured between $A_1$ and $A_2$.

Figure 5:
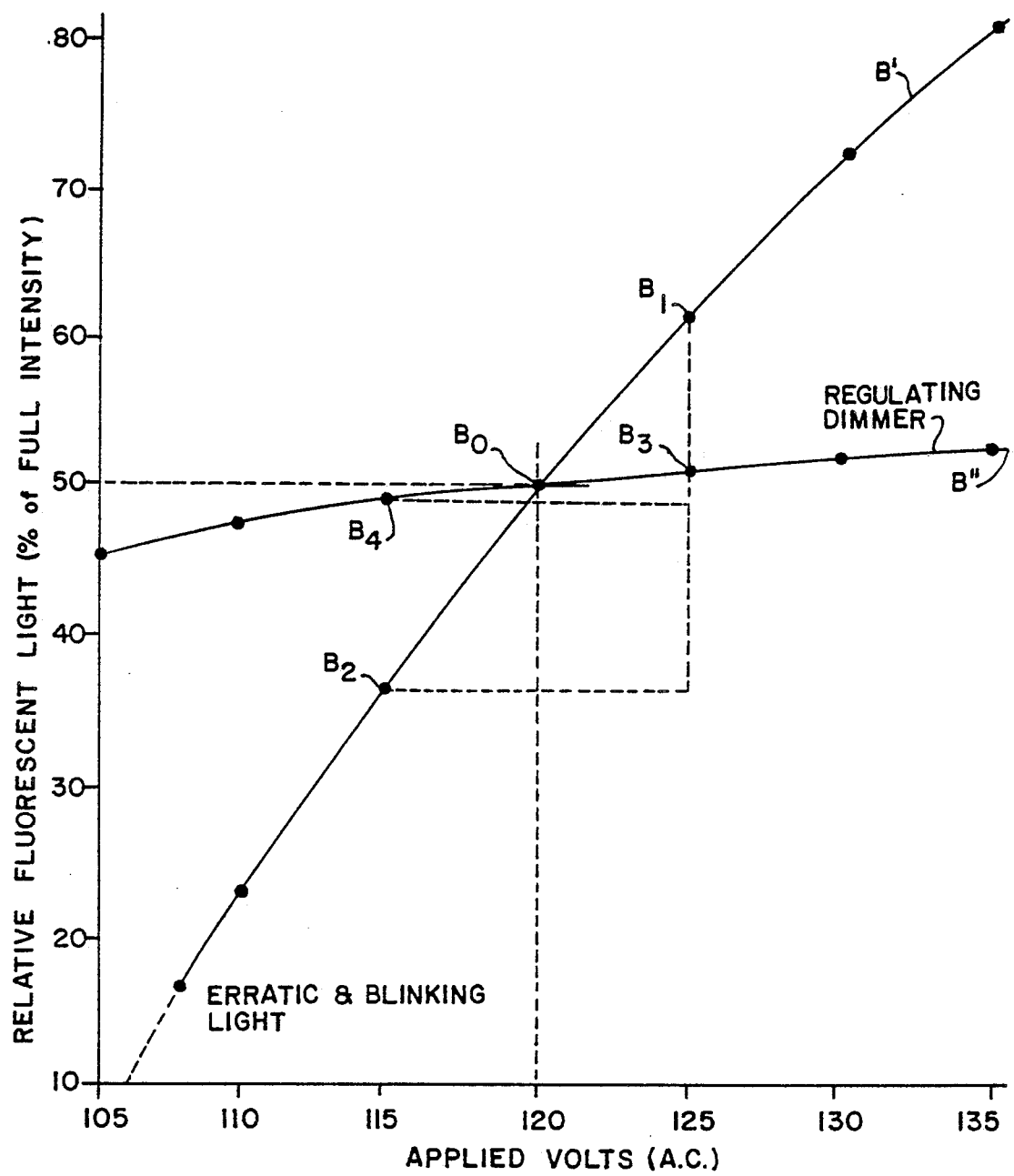
FIG. 5 is similar to FIG. 4, and illustrates the response of light intensity to variations in line voltage for a conventional dimmer as contrasted to the equivalent response for the regulating dimmer in accordance with the present invention.

FIG. 5 illustrates the response of light intensity to variations in line voltage for a conventional dimmer (curve B') as contrasted to the equivalent response for the regulating dimmer in accordance with the present invention (curve B''). Here, the nominal operating point $B_o$ is again taken at 120 volts A.C., and each dimmer is set for 50% dimming. The curve B' for the conventional dimmer, taken between $B_1$ and $B_2$, exhibits an average slope of 2.4% light intensity per volt at the operating point $B_o$ or 120 volts A.C. The corresponding average slope for the regulating dimmer in accordance with the present invention, taken between $B_3$ and $B_4$ of curve B″ exhibits an average slope of 0.2% light intensity per volt. As can be seen, therefore, the conventional dimmer is far more sensitive to changes in applied voltage, in this instance by a factor of approximately 12.

FIG. 5 indicates in synoptic format the responses of both the conventional and the regulating dimmer in accordance with the pesent invention to changes in supply line voltage for several arbitrary intensity levels. The intensity levels of the dimmer is set by adjustment of the potentiometer 56 in FIG. 3. The curves C′, D′, E′ and F′ are those associated with the conventional dimmer, while curves C″, D″, E″ and F″ are for the regulating dimmer in accordance with the present invention.

The curves C′ and C″ have been shown for a 78% nominal setting of measured relative light intensity, curves D′ and D″ at 63% setting, E′ and E″ at 50% setting and F′ and F″ at 41% setting. The average slopes have been measured for each of the curves at the initially preset operating conditions $C_o$, $D_o$, $E_o$ and $F_o$, each of which represents operation at 120 volts applied A.C.

At a setting of 78% of nominal light value, there is an average of 1.94% change in brilliance per volt change of applied voltage for the conventional dimmer as compared to an average of 0.8% change in brilliance per volt change of applied voltage. At 63% setting of nominal light value, the conventional dimmer exhibits 2.1% change in brilliance per volt of change of applied voltage as compared to 0.35% change in brilliance per volt change of applied voltage for the subject dimmer. At 50% of nominal light value, the conventional dimmer exhibits a 2.4% average change in brilliance per volt change of applied voltage as compared with only 0.2% for the dimmer of the present invention. In the remaining curves, representing a 41% setting of nominal light value, the conventional dimmer exhibits 2.5% average change in brilliance per volt change of applied voltage as compared with 0.16% such average change per volt change of applied voltage for the described subject dimmer.

Figure 6:
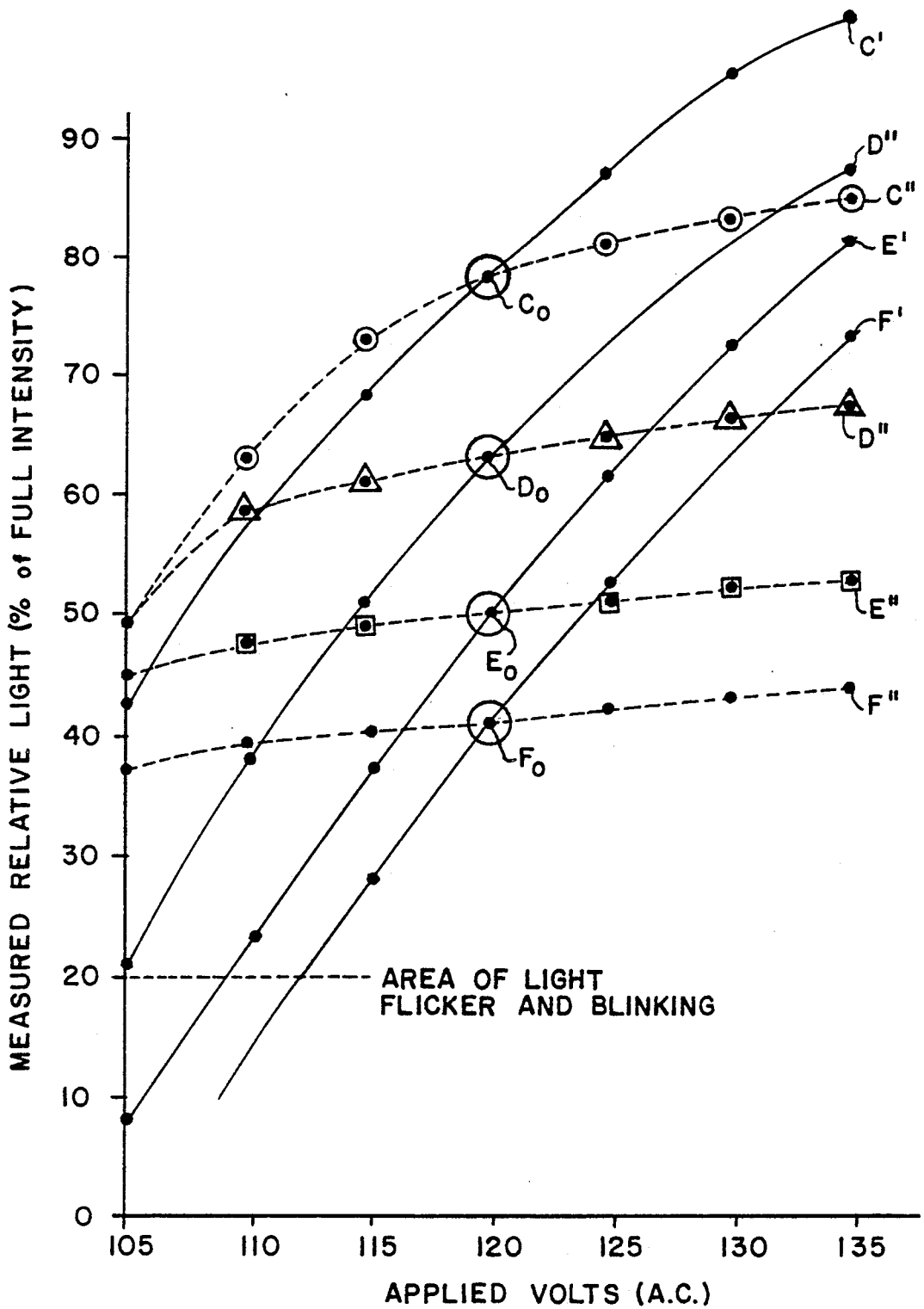
FIG. 6 indicates in synoptic format the responses of both conventional and the regulating dimmer in accordance with the present invention to changes in supply line voltage for several arbitrary intensity levels.

The curves of FIG. 6 illustrate that there is an improvement in operating characteristics at almost all preset levels of dimming. However, the greater the initial dimming, the greater the improvement in operating characteristics. Thus, the electrical circuit in accordance with the invention provides increasingly smaller changes in output light intensity as a percent of full or nominal light intensity per volt of applied input A.C. voltage with increased amounts of initial dimming of the fluorescent lamps. In this manner, the lower the desired predetermined levels of intensity that are selected relative to the nominal level of intensity, the more uniform the level of intensity that is maintained with line and load changes and aging of the fluorescent lamps. The opposite result is exhibited by the conventional dimmers.

In addition to the obvious and measureable advantages of the regulating dimmer in compensating for varations in line voltage, tests were conducted to determine its efficacy in load regulation. In these tests, the applied line voltage was held constant at a nominal 120 volts A.C. To simulate lamps which have aged and are producing reduced levels of brilliance, tubular translucent filters of several optical densities were configured to slide easily on and off the fluorescent lamps. As a point of reference, the unfiltered lamps were installed and two dimmer types were set to 50% dimming as measured at several random points on the surface of an X-ray film illuminator. An average illumination level was calculated from the samples. Next, filters were installed on the lamps which reduced the emitted light from the lamps by 60%. Measurements were again taken of the light levels at the same sample points used in the reference condition. When the readings were averaged, the illumination level of the lamps driven by the conventional dimmer was reduced by approximately 60%, which is consistent with the optical density of the filter. The illumination levels recorded and averaged for the regulating dimmer of the present invention under like conditions were reduced by approximately 5% from the unfiltered light levels. Several densities of filters were tested with similar results. Thus, the circuitry configured by the subject regulating dimmer provides excellent compensation for normally encountered line voltage variations of from below 110 A.C. to more than 130 volts A.C., and for reductions of up to 60% in light output associated with losses of lamp efficiency. Additionally, the visual device signaling device in the form of the LED 102 and associated circuitry proved to be an effective visual warning to help determine when lamp replacement should be made or considered.

While the invention is described with reference to specific embodiments thereof and with respect to the incorporation therein of certain combinations of features, it is to be understood that the invention may be embodied in other forms, many of which do not incorporate all of the features present in this specific embodiment of this invention which has been described. Thus, while one specific circuit has been described for controlling the light intensity output of fluorescent lamp may be used. Additionally, many of the advantages of the present invention can also be achieved if other light sources are used other than fluorescent lamps. Thus, halogen and incandescent lamps can also be used with varying degrees of advantage. Further, while it is presently desired to conceal the pre-setting potentiometer 56 from the user, it may be desirable, in some instances, to make such potentiometer readily accessible. For this reason, the invention is to be taken and limited only as defined by the claims that follow.

What is claimed is:

1. X-ray viewer comprising a housing, at least one fluorescent lamp within said housing, and a light transmissive screen forming a wall of said housing for passage of light from said at least one fluorescent lamp to allow viewing of an X-ray or other transparency placed outside said housing adjacent said screen; photo-detector means arranged within said housing proximate to said at least one fluorescent lamp for detecting the intensity of the direct light output emitted by said at least one fluorescent lamp prior to transmission through said screen; and electrical circuit control means for dimming said at least one fluorescent lamp to a desired predetermined level below the nominal light intensity level and automatically adjusting the light intensity to maintain a substantially uniform light intensity output from said at least one fluorescent lamp corresponding to said desired predetermined light intensity level thereby compensating for factors influencing the light intensity output of said at least one fluorescent lamp, including line and load variations and aging of said at least one fluorescent lamp.

2. X-ray viewer as defined in claim 1, wherein said photo-detector comprises a silicon cell.

3. X-ray viewer as defined in claim 1, wherein said electrical control means comprises feedback means cooperating with said photo-detector means for comparing a reference signal with a signal which is a function of the light output intensity of said at least one fluorescent lamp and for generating a control voltage which adjusts light intensity until it attains said desired predetermined level.

4. X-ray viewer as defined in claim 1, wherein said electrical circuit control means includes pre-setting means for pre-setting the dimming level of said at least one fluorescent lamp to said desired predetermined level.

5. X-ray viewer as defined in claim 4, wherein said pre-setting means is arranged to be generally inaccessible from the outside of said housing 6. X-ray viewer as defined in claim 5, wherein said pre-setting means is disposed within said housing, whereby initial adjustments can be made by the manufacturer but not by the user.

7. X-ray viewer as defined in claim 4, wherein said pre-setting means is set to provide a light output less than approximately 75% of the nominal light output of said at least one fluorescent lamp.

8. X-ray viewer as defined in claim 7, wherein said electrical circuit control means provides relative changes in output light intensity as a percent of full or nominal light intensity equal to approximately 0.8% per change in one volt of applied A.C. input voltage.

9. X-ray viewer as defined in claim 4, wherein said pre-setting means is set to provide a light output less than approximately 65% of the nominal light output of said at least one fluorescent lamp.

10. X-ray viewer as defined in claim 9, wherein said electrical circuit control means provides relative changes in output light intensity as a percent of full or nominal light intensity equal to approximately 0.35% per change in one volt of applied A.C. input voltage.

11. X-ray viewer as defined in claim 4, wherein said electrical circuit control means provides relative changes in output light intensity as a percent of full or nominal light intensity equal to approximately 50% per change in one volt of applied A.C. input voltage.

12. X-ray viewer as defined in claim 11 wherein said electrical circuit control means provides relative changes in output light intensity as a percent of full or nominal light intensity equal to approximately 0.2% per change in one volt of applied A.C. input voltage.

13. X-ray viewer as defined in claim 4, wherein said electrical circuit control means provides relative changes in output light intensity as a percent of full or nominal light intensity equal to approximately 13% per change in one volt of applied A.C. input voltage.

14. X-ray viewer as defined in claim 13, wherein said electrical circuit control means provides relative changes in output light intensity as a percent of full or nominal light intensity equal to approximately 0.16% per change in one volt of applied A.C. input voltage.

15. X-ray viewer as defined in claim 1, wherein said electrical circuit control means provides increasingly smaller changes in output light intensity as a percent of full or nominal light intensity per volt of applied input A.C. voltage with increased amounts of initial dimming of said at least one fluorescent lamp, whereby the lower said desired predetermined level of intensity is selected relative to the nominal level of intensity, the more uniform the level of intensity maintained with line and load changes and aging of said at least one fluorescent lamps.

16. X-ray viewer as defined in claim 1, further comprising warning means for providing a signal when said electrical circuit control means is no longer capable of adjusting said at least one fluorescent lamp to provide said desired predetermined level of light intensity.

17. X-ray viewer as defined in claim 16, wherein said warning means includes an LED for providing a visible flag.

18. X-ray viewer as defined in claim 16, where said warning means includes comparator means for comparing a first signal which is a function of the actual light intensity of said at least fluorescent lamp and a reference signal which is indicative of the nominal light intensity achievable by said fluorescent lamp.

19. X-ray viewer comprising a housing, at least one light source within said housing, and a light transmissive screen forming a wall of said housing for passage of light from said at least one light source to allow viewing of an X-ray or other transparency placed outside said housing adjacent said screen; photo-detector means arranged within said housing proximate to said at least one light source for detecting the intensity of the light emitted by said at least one light source prior to transmission through said screen; and electrical circuit control means for dimming said at least one light source to a desired predetermined level below the nominal light intensity level and automatically adjusting the light intensity to maintain a substantially uniform light intensity output from said at least one light source corresponding to said desired predetermined light intensity level thereby compensating for factors influencing the light intensity output of said at least one light source, including line and load variations and aging of said at least one light source.

* * * * *